(12) United States Patent
Rickerson, Jr.

(10) Patent No.: US 7,053,822 B2
(45) Date of Patent: May 30, 2006

(54) WEARABLE SATELLITE TRACKER (76) Inventor: Donald Rickerson, Jr., 10317 Amberleigh Ct., Manassas, VA (US) 20110

( * ) Notice: Subject to any disclaimer, the term of this patent is extended or adjusted under 35 U.S.C. 154(b) by 0 days.

(21) Appl. No.: 10/463,050

(22) Filed: Jun. 16, 2003

(65) Prior Publication Data
US 2004/0113836 A1    Jun. 17, 2004

Related U.S. Application Data (60) Provisional application No. 60/400,944, filed on Aug. 2, 2002.

(51) Int. Cl.
H04B 7/185    (2006.01)
(52) U.S. Cl. .............................. 342/357.07; 342/357.13
(58) Field of Classification Search ........... 342/357.01, 342/357.06, 357.07, 357.13; 701/207, 213, 701/215
See application file for complete search history.

(56) References Cited

U.S. PATENT DOCUMENTS 5,905,461 A * 5/1999 Neher ................... 342/357.07
5,963,130 A * 10/1999 Schlager et al. ............ 340/540
6,057,759 A * 5/2000 Marsh .................... 340/539.11
6,317,050 B1 * 11/2001 Burks ....................... 340/573.6
6,439,941 B1 * 8/2002 McClure et al. .............. 441/89
6,487,983 B1 * 12/2002 Jonsson et al. .......... 114/144 R
2005/0118905 A1 * 6/2005 Pallister et al. ............... 441/80

* cited by examiner

Primary Examiner—Dao Phan (57) ABSTRACT

The Wearable Satellite Tracker (WST) is a worn by the operator and carries a two-way satellite transceiver that communicates to a Central Tracking Monitor a message with; a unique serial number of the device, position information (via GPS receiver), and the status of the WST. It requires no local equipment, local power or monitoring personal. Because it does not relay on any local equipment, cellular or any local network it can therefore can be used anywhere in the world. The system provides for test messages which give an acknowledgement that the complete system is working. It can be embedded into a personal floatation device for use on water or into a utility belt for use on land. The alarm can be triggered with a water sensor, panic button for the operator and/or other sensors as require by the operation environment. The Central Tracking Monitor will register test messages the WST has passed and for alarms it will alert persons or organizations as required. The ability to send and receive a system check message from the Central Tracking Monitor by the operator gives a high degree of confidence of the WST working in an alarm state.

3 Claims, 9 Drawing Sheets

Fig 9 WST Data Message

WST Message

| Byte | |
|---|---|
| 1 | Version |
| 2-7 | Serial Number of WST |
| 8-20 | Status & Location of WST |
| 21-24 | Time of Transmission |
| 25-30 | Reserved |

WEARABLE SATELLITE TRACKER

CROSS-REFERENCE TO RELATED APPLICATIONS

This application claims the benefit of U.S. Provisional Application serial No. 60/400,944 filed Aug. 2, 2002

Schlager, U.S. Pat. No. 5,963,130, filed Oct. 5, 1999, Self-locating remote monitoring system Curcio, Joseph, U.S. Pat. No. 6,414,629, filed Jul. 2, 2002, Tracking Device Burks U.S. Pat. No. 6,317,050 filed Nov. 13, 2001 Water entry alarm system McClure, U.S. Pat. No. 6,439,941, filed Aug. 27, 2002, Automated fail-safe sea rescue flotation system

STATEMENT REGARDING FEDERALLY SPONSORED RESEARCH OR DEVELOPMENT n/a

INCORPORATION-BY-REFERENCE OF MATERIAL SUBMITTED ON COMPACT DISK

N/A

BACKGROUND OF THE INVENTION (1) Field of the Invention

The present invention relates to satellite communications and, more particularly, to personal safety devices (2) Description of Related Art Including Information Disclosed Under 37 CFR 1.97 and 1.98

Schlager, U.S. Pat. No. 5,963,130, Oct. 5, 1999, Self-locating remote monitoring system Curcio, Joseph, U.S. Pat. No. 6,414,629, Jul. 2, 2002, Tracking Device Burks U.S. Pat. No. 6,317,050 Nov. 13, 2001 Water entry alarm system McClure, U.S. Pat. No. 6,439,941, Aug. 27, 2002, Automated fail-safe sea rescue flotation system The Schlager patent discusses a man-over-board system. The remote has a navigational receiver and a radio transmitter. The monitor has a radio base station for receiving the signal from the remote. The remote and monitor radios are in constant radio contact.

The alarm at the monitor is triggered when;
the radio signal between the two radios goes below a settable signal level (establishing a geo-fence), or
a GPS (navigational satellite) location is correlated to exceed a settable distance, or
the transmit/receive time between the units exceeds a settable limit, or
a curfew time is exceeded, or
a sensor on the remote is triggered (by water, smoke, heartbeat or other sensor), or
the person hit a "panic button".

The remote and monitor radios must have line-of-site. The embodiments as a child monitor at a pool or a medical patient monitor demonstrate the short range of the device. In the man-over-board embodiment, the monitor has a display showing location of the remote.

All these embodiments require the remote and monitor radio are within line-of-sight. This means that the system is a very local. The remote is also very battery limited because of the need for constant radio communications. Ground or sea-level radio systems are very limited in distance; it is a few miles at best and a few hundred feet in swells.

The embodiment of a wireless (cell) phone or radio-telephone in the remote which allows it to call a preset 911-like number imposes a similar line-of-sight restriction as of having of a monitor with a cellular transceiver. That is, if the remote does not have line-of-sight with the cell system or radio-telephone of the monitor, the remote is lost. At sea or on land, this is limited to a few miles at best.

The monitor, especially in the case of man-over-board embodiment, must have radio equipment that is installed, manned, powered, and maintained. These is a burden for any vessel and useless to a lone-pilot or life raft situation. In any situation where the monitor must have working equipment and competence in its usage for this system to work, the remote is at risk even if the remote equipment is good working order.

Another embodiment is this system's use as a weather monitor; again we are at the mercy of a working monitor to gather then information from the remotes via line-of sight radio. To work over any large area we must install an infrastructure of monitor sites.

The Wearable Satellite Tracker has the novel approach from Schlager that it does not require any local monitoring. There is no local monitoring equipment that will need monitored, powered or maintained. In the Wearable Satellite Tracker all monitoring of the remote is done over satellite to a Central Tracking Monitor that monitor all Wearable Satellite Tracker in the world or with a spec.

Monitoring the Wearable Satellite Tracker by satellite allows it to be monitored any where in the world for a central point where monitoring resources can be focused to provide full period service with qualified personnel.

Nowhere is the term satellite used in the Schlager patent. The Schlager patent is limited to a one remote to one monitor ratio.

Curcio, Joseph, U.S. Pat. No. 6,414,629, Jul. 2, 2002, Tracking Device

This patent has a GPS tracking unit and transmitter on the remote and a local receiver. The local receiver determines the heading and direction to the remote. The receiver then provides the monitor a compass heading and distance to the remote. The radio communications path between the remote and monitor radios is line-of-sight. The monitor must be paying attention to the device and the tracking equipment must be in good working order.

The difference is that Curcio patent is for a local tracking, the remote and monitor must have radio with line-of-sight between the two. In the case of a lone-pilot or no one noticing someone falls overboard, the device will not work. Line of sight on a flat surface like a calm ocean is limited to a few miles if the monitor has an antenna on a very tall mast on a ship. However, if the seas have swells the line of site distance is very limited.

If the ship, which contains the monitoring device, should sink, this device is useless in informing authorities of the location of the survivors. Additionally, at sea, this device requires that each vessel or using the device must buy equipment for both the remote and monitor. The monitor equipment must be properly installed, powered, manned and maintained. If the monitors circuits, batteries, antenna should fail, the remote is useless. Full redundancy of monitoring equipment is needed to ensure a high reliability of service. This is a sufficient cost for each vessel to bear in terms of equipment, space and manpower. The device is also useless for lone-ship pilots, air-plane crews, or life rafts adrift where no monitor is available.

On land the tracking distance for this system will be very limited by ground obstructions and only good for short distances when the monitor equipment is available, manned, powered and maintained.

Burks U.S. Pat. No. 6,317,050 Nov. 13, 2001 Water entry alarm system

Burks water enter alarm system is a harness intent for children in a pool area. The remote (child with a water entry harness on) will trigger the alarm on the monitor radio if the remote does one of the following;

enters the water, or
the belts are unhooked, or
the radio signal from remote to monitor is absent.

This patent is also dependent on a line-of-site radio transmission between the remote and monitor. There is always a local monitor radio receiver needed. The patent is intended only for short ranges for children in a local pool or water danger area. It does not envision itself as a global tracking for rescue service, but as a very local monitor.

It is therefore an object of the Wearable Satellite Tracker to provide a greater degree of personal safety by providing a central management of the satellite tracker rather than relying on local availability of monitoring equipment and personal seen in previous inventions

BRIEF DESCRIPTION OF THE INVENTION

Summary of the Invention

The Wearable Satellite Tracker (WST) is a worn by the operator and carries a two-way satellite transceiver that communicates to a Central Tracking Monitor a message with; a unique serial number of the device, position information (via GPS receiver), and the status of the WST. Optionally, the WST will have a satellite telephone interface to place a emergency call to the Central Tracking Monitor. The WST can be used anywhere in the world and requires no other local equipment. An embodiment of the WST is a Personal Flotation Device or Life Vest with the WST embedded in it. The Life Vest owner can trigger the Life Vest with a panic button at will or, upon being immersed in water, the WST will self-trigger. In the Alarm-state, the WST send frequent alarm messages to the Central Tracking Monitoring, a LED Status Indicator will show the operator of the WST its progress in sending a message to the Central Monitoring Center. These are acknowledged messages and the WST wearer knows they have been received. Both status checks and alarms messages will be sent to a Central Tracking Monitor. The Central Monitoring Center will then mate the unique ID of the WST and with its database information, and begin notifying the appropriate authorities in the event of an alarm message. Most importantly with the WST, there is no new equipment or personal needs to be added to the vessel or operation unit to monitor the WST. The WST is self-contained and includes; a visual check for operator to confirm the operational status of the battery, GPS, satellite transceiver and communication to the Central Tracking Monitor. Test messages can be initiated by the wearer of the WST to ensure the complete system is working before the beginning a shift, or during, a work shift.

This invention provides for the introduction of a higher level of safety for the Wearable Satellite Tracker (WST) operator, both in the water and on land, without the need for addition monitoring equipment or personnel at the place of its usage. This is very important for small vessels or operations which try to minimize the number of personnel needed and equipment to support. The local operation does not need to worry about the powering, storage, maintenance and logistics of a separate monitoring unit for the remote unit. The Centralized Monitoring Center provides 24 hour a day service via worldwide or regional satellite network. Numerous cases can be cited where someone falls off a ship and it is hours before it is know they are missing because only one man is on shift and on a lone sailor craft, there is no monitor personal available. Centralized monitoring solves these problems.

BRIEF DESCRIPTION OF SEVERAL VIEWS OF THE DRAWINGS

A complete understanding of the present invention may be obtained by reference to the accompanying drawings, when considered in conjunction with the subsequent, detailed description, in which.

For purposes of clarity and brevity, like elements and components will bear the same designations and numbering throughout the FIGURES.

DETAILED DESCRIPTION OF THE INVENTION

Description of the Preferred Embodiment

Figure 1:
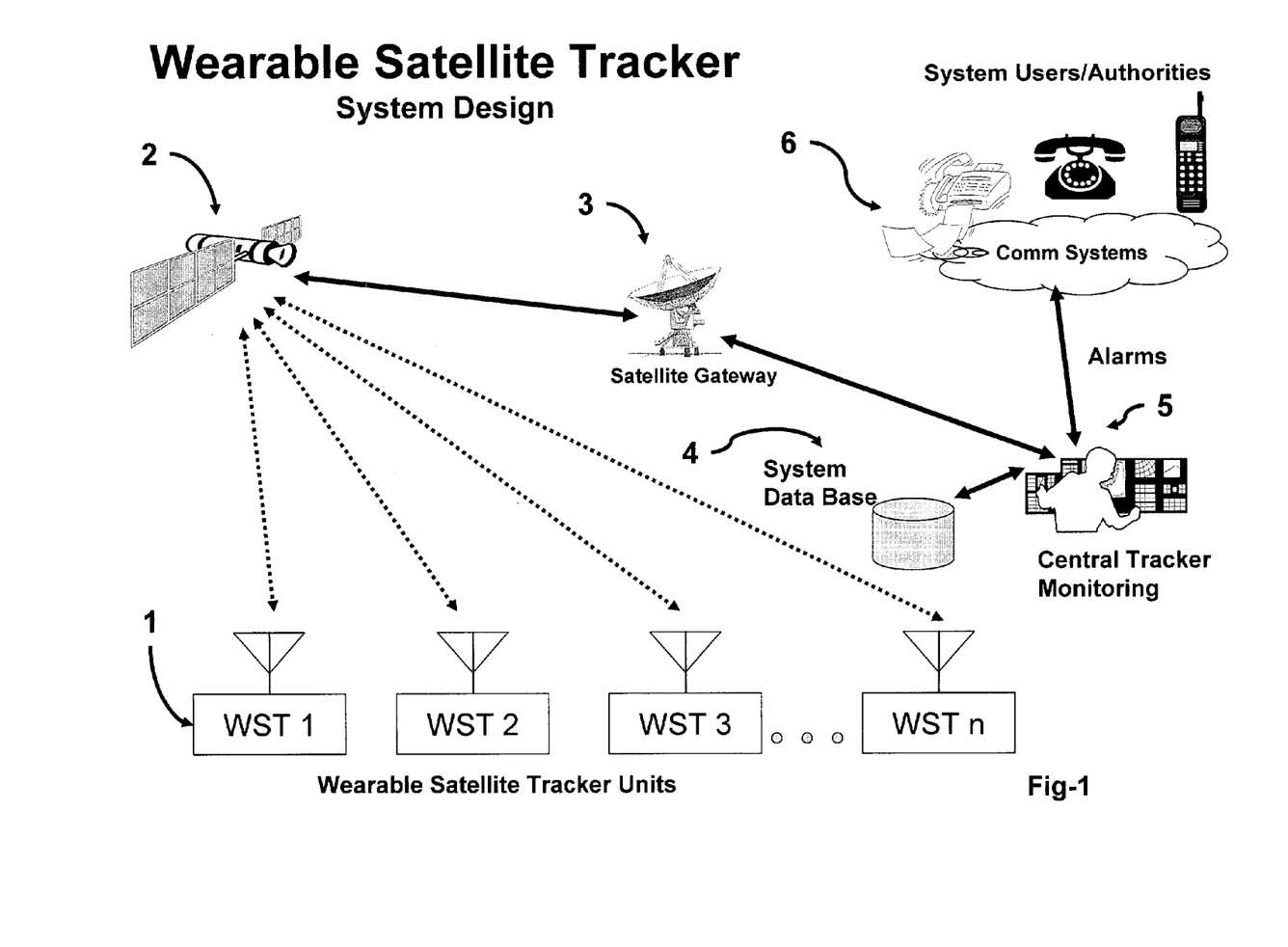
FIG. 1 is a perspective view of a high level view of the Wearable Satellite Tracker and its supporting system which provides centralized service to a larger number of tracking units deployed anywhere in the world.

FIG. 1 shows the high level view of the Wearable Satellite Tracker and its supporting system. Item 1 shows a large number of Wearable Satellite Tracker units 1 that can be supported but the Satellite System 2. This is possible because of the very low bandwidth requirement and infrequent traffic from each unit. Therefore the Satellite System 2 depicted in 2 can provide a communications path for a very large number of remote units. We are initially deploying the system using the Iridium™ satellite network. Iridium™ will give true worldwide coverage; Iridium also gives us a Doppler shift position report which acts as a backup to the GPS position report. However, it is possible that this system could use another Satellite System 2, if that system's coverage met the customer needs for availability. Item 3 shows the Satellite System 2 earth station where the Satellite System 2 would interface with either a public or private circuits providing either voice or data links to 5, the Central Tracker Monitor 5. The Central Tracking Monitor (5) is a 24 hour-on service that logs all communications with each Wearable Tracking Unit into the System Database (4) these both test and alarm messages, also a Central Database 4 also contains the WST owners registration and alarm contact information. The Central Tracker Monitor 5 uses the alarm notification information from the database to contact the owner and appropriate authorities (6), though various public of private communication means; pager, PSTN, fax, email, telex, and satellite voice and data system. These alarm notifications would like include the satellite phone or fax of vessel where the Wearable Satellite Tracker is assigned.

Figure 2:
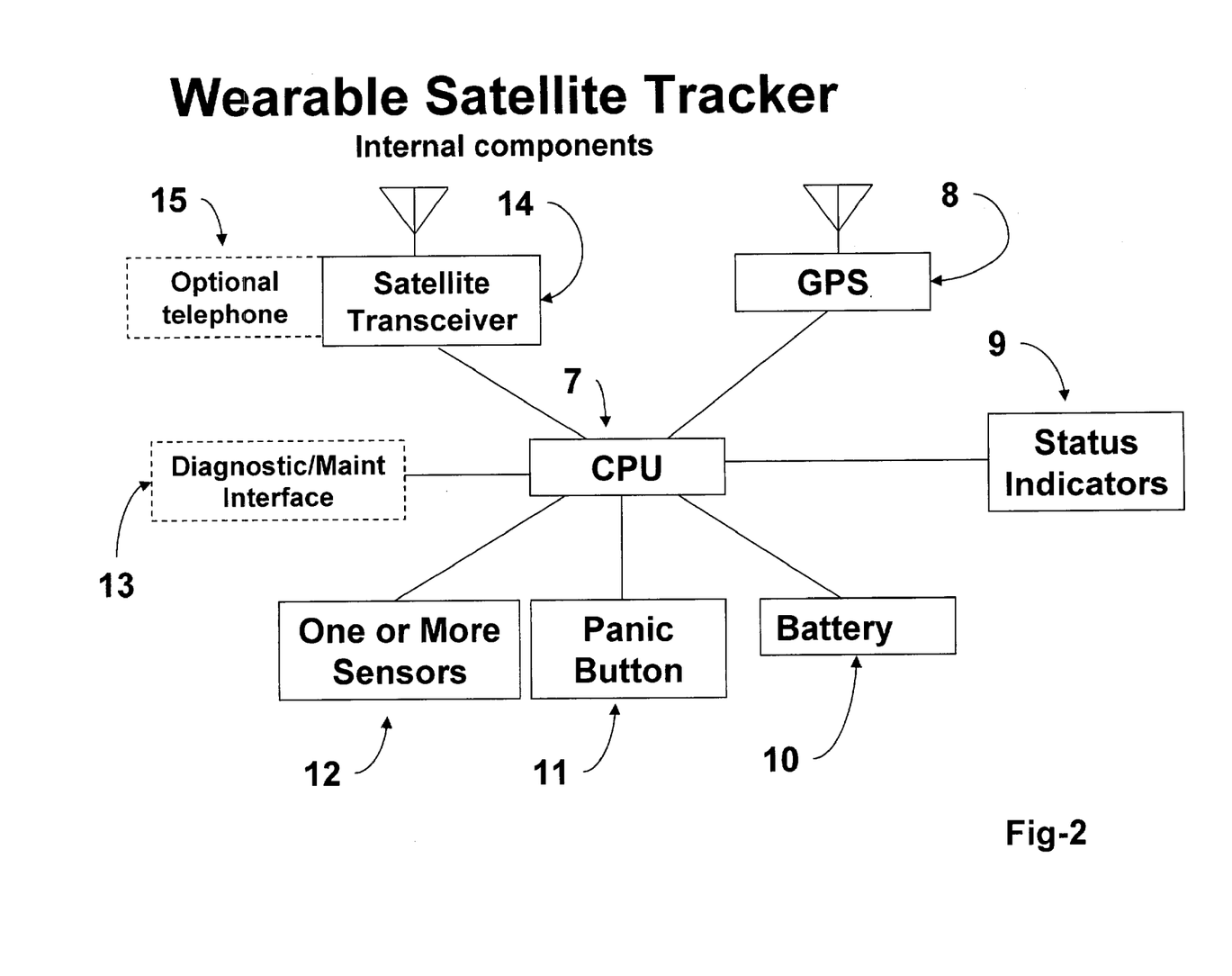
FIG. 2 is a perspective view of the subsystems of the Wearable Satellite Tracker unit which is worn by a user.

FIG. 2 shows the subsystems of the Wearable Satellite Tracker Remote unit. It is a flexible design that can be incorporated into wearable accessories for both land and sea operations. The CPU (7) is a low-power processor to achieve the maximum life of the batteries. It is electrically connected to the following components; an serial connection to the GPS receiver (8), a serial connection to the System Status Indicator (9), power wires to the battery 10 (10), simple wires to the Panic Button 11 (11) for manual activating the WST to the alarm state; and simple wires to the Other Sensor(s) (12) this is a automatic sensor for the WST, for example, as a Immersion Sensor 28 when it is a personal flotation device of life preserver; the Maintenance Interface (13) allows a laptop computer with the custom software to communicate with the CPU for software updates and detailed test of the subsystems. The Satellite Transceiver (14) provides two-way communications with the Satellite System 2 to the Central Tracker Monitor 5, and there is an optional Audio (15) interface for the Satellite Transceiver to provide 2-way telephone communications with the personnel at the Central Tracker Monitor 5. There are additional sensors (12) as required for particular embodiments as required, for example, a radiation sensor for nuclear workers, poison gas sensor for hazardous material worker, air pressure for a pilot, or G-force sensor for a mountain climber.

Figure 3:
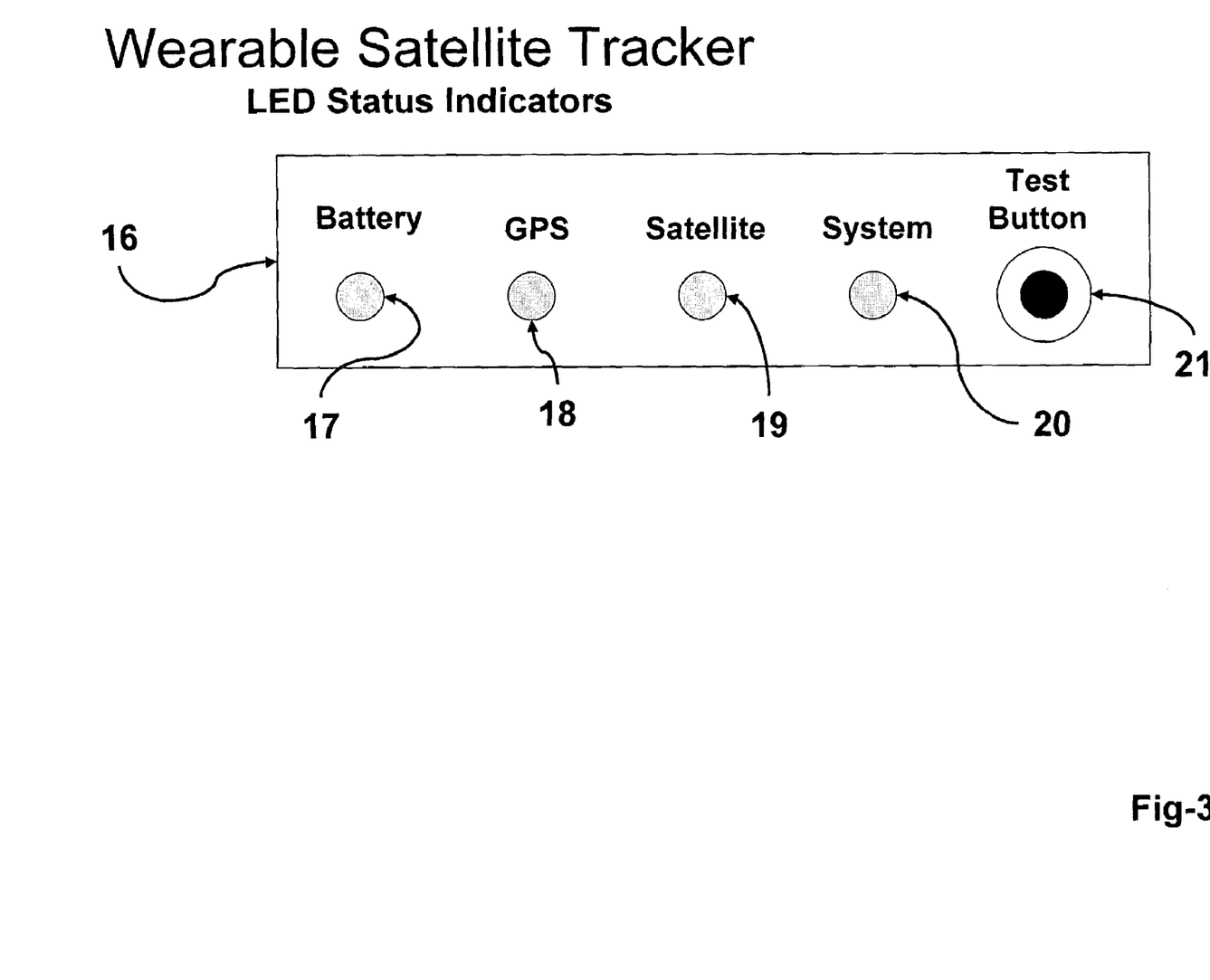
FIG. 3 is a perspective view of a Light Emitting Diode (LED) Status Indicator (16) in which the operator can verify the operational status of the Wearable Satellite Tracker and it major subsystems. An advanced version of these indicators would be a textual/graphic LCD screen similar to that used with a cell phone which could give more detailed information on the Wearable Satellite Tracker status.

FIG. 3 shows the Light Emitting Diode (LED) Status Indicator 9 (16) in which the operator can verify the operational status of the WST and it major subsystems. Most importantly, it provided an acknowledgement from the Center Tracking Monitor that the test message from the WST was received. The operator of the WSR is shown the subsystem status with three LED colors with each color representing a status of a subsystem. The subsystems are Battery 10 (17), GPS Receiver (18), 2-way Communications Satellite (19) and Total System Status (21). It is initially envisioned that we will use the common light colors of red, yellow and green to indicate the following subsystem status;

Batter 10 (17)—red (batter 10 has insufficient power to run the system), yellow (voltage is low, battery 10 will need exchanged or charged soon), and green (batter 10 power is OK).

GPS Receiver (18)—red (GPS is not responding), yellow (poor quality position received), green (position received is OK).

2-Way Communications Satellite (19)—red (satellite transceiver is not responding), yellow (satellite transceiver is on, but not registered) and green (satellite transceiver is registered with the Satellite System 2).

Total System Status (20)—red (test message has not been sent to the Central Tracker Monitor 5), yellow (test message has been sent to the Central Tracker Monitor 5), green (acknowledgment has been receiver from the central Tracker Monitor 5 for the test message).

These are the planned LED colors; the availability of LEDs may require a change in color that would meet production requirements. The Test Button 21, when held down for a short period of time, e.g., 5 seconds, it will be sensed by the CPU and the place the unit into a test state where all sub-system are checked and test message is sent to and recorded by the Central Monitoring Center. As each subsystem is checked, its status is displayed with a LED.

Figure 4:
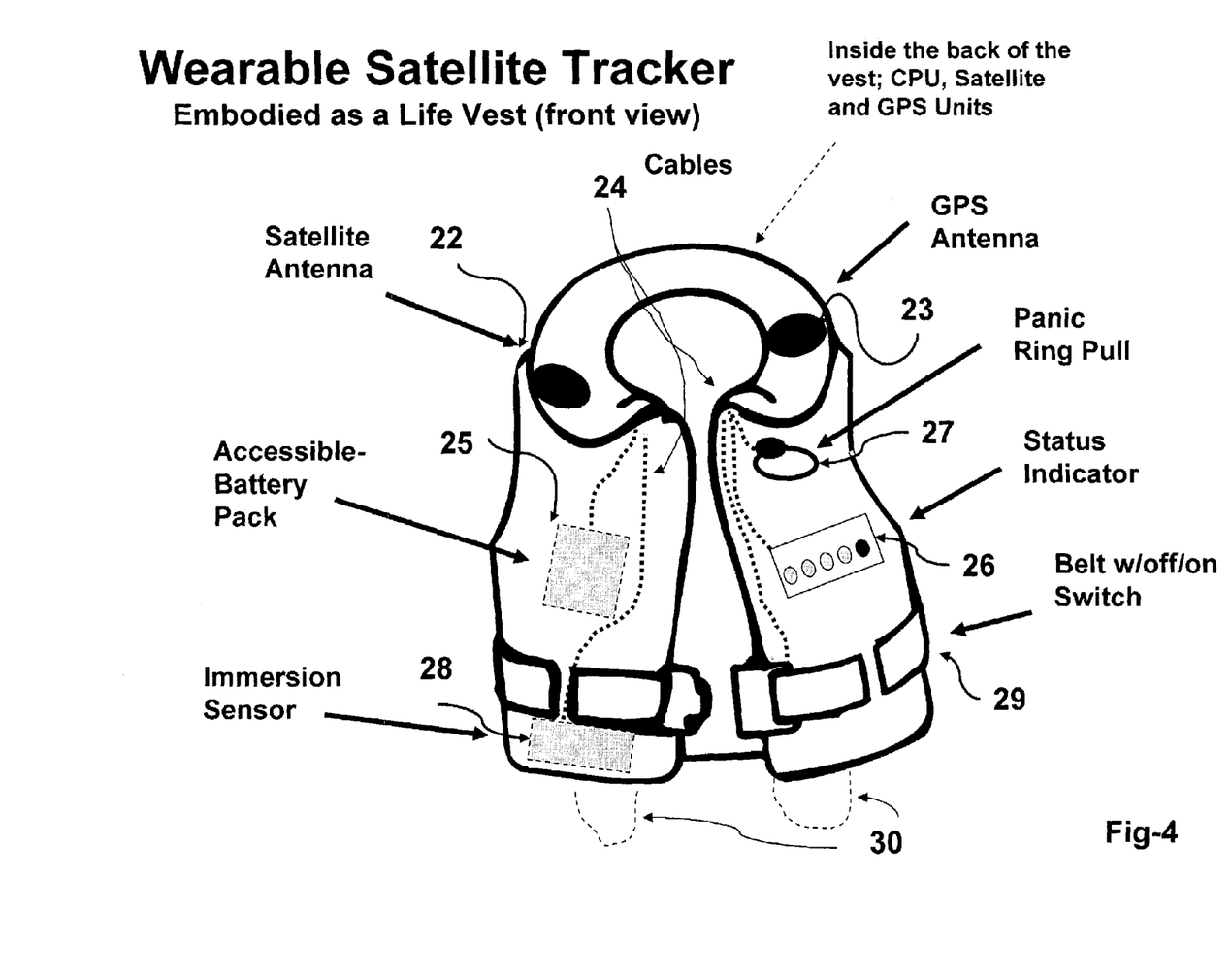
FIG. 4 is a front view of the embodiment of the Wearable Satellite Tracker as a personal floatation device or popularly called a "life vest". The satellite tracking modem, processor, GPS, and antenna are embedded within the vest.

FIG. 4 shows the front view of an embodiment of the WST as a personal floatation device or popularly called a life vest. Because of the thickness of a life vest, the components can be embedded into the vest material or into external pockets. In the collar or shoulder part of the vest are the two-way satellite antenna 22 and the GPS Receiver antenna (23). These are in the upper part of the vest to keep them above the water. They are shown here as separate antennas; they could be combined into a single dual-purpose antenna as those become affordable. The antennas are connected with coax cable to the processor package shown in FIG. 6. The following items are accessible to the operator, so are located in the front of the vest; the battery pack 25, the Status Indicator 9 and the operator activated Panic Button 11 shown as a pull cord. In this embodiment as a Life Vest we have elected two additional sensors; an Immersion Sensor 28 to determine we are in the water and a Belt off/on switch that tells if the belt is bucked. In the particular embodiment, the operator can always trigger an alarm state by activating the panic button 11, for example, if he knows the boat is sinking or the unit will automatically alarm if the Belt switch 29 is ON and the Immersion Sensor 28 shows IN WATER, for example, if the operator is hit in the head and falls in the water and therefore unable to active the alarm himself. The leg straps 30 to keep the operator from slipping out of the vest when floating in the water.

Figure 5:
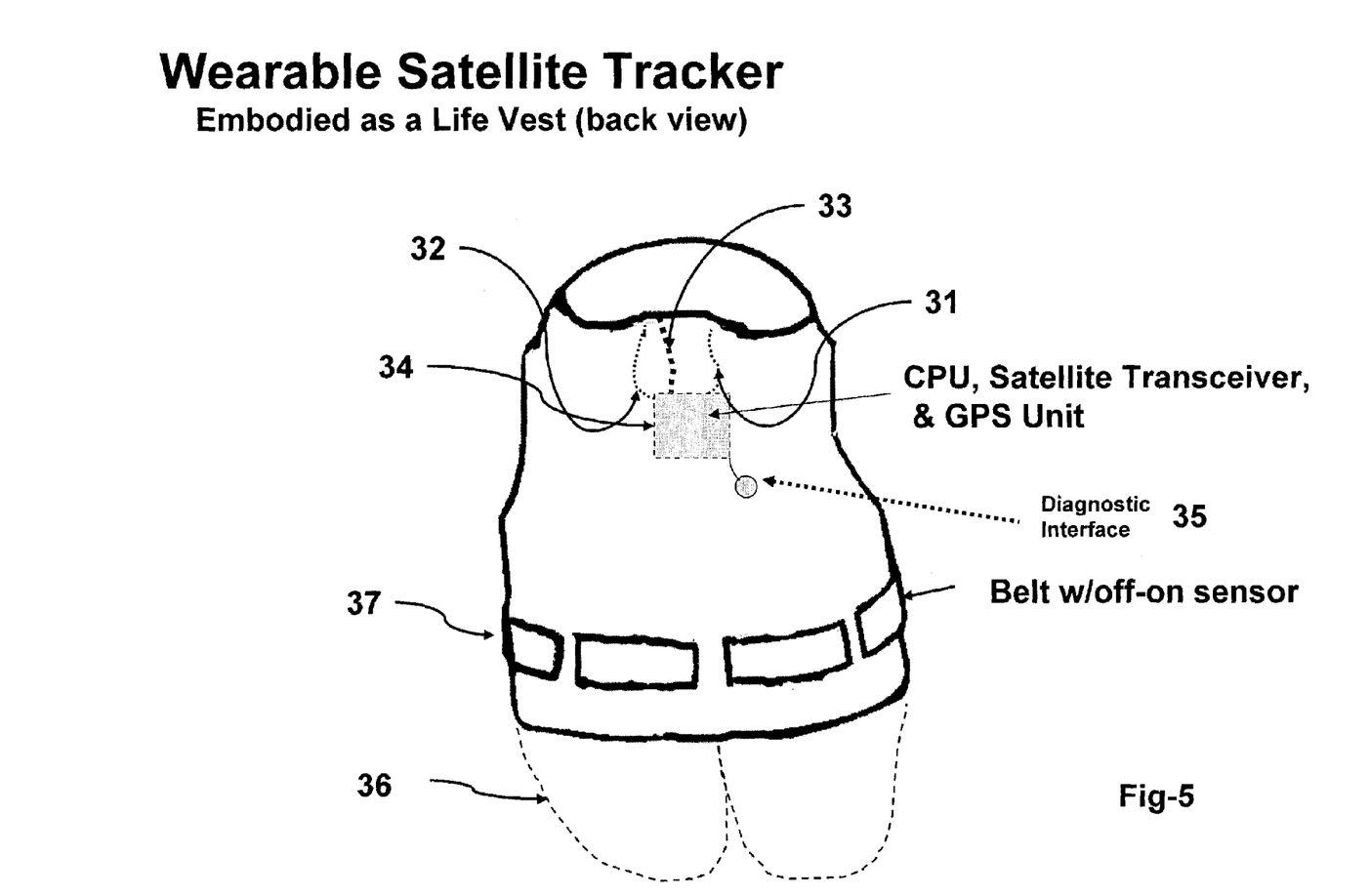
FIG. 5 is a rear view of of the embodiment of the Wearable Satellite Tracker as a life vest as shown in FIG. 4, rear view.

FIG. 5 show the back of the embodiment of the WST as a life vest. The coax cable from the two-way satellite antenna 22 (31) and the GPS Receiver antenna (32) are brought from the collar or shoulder mounted antenna to the processors. The battery 10, panic button 11, sensor, and status Indicator 9 connections to the CPU, Two-way Satellite Transceiver and GPS receiver water-proof package are cabled with 33. The diagnostic interface (35) allows the connection of the maintenance computer to upgrade software and upgrade software. The leg straps 30 (36) keep the operator from falling out of the vest while floating in the water.

Figure 6:
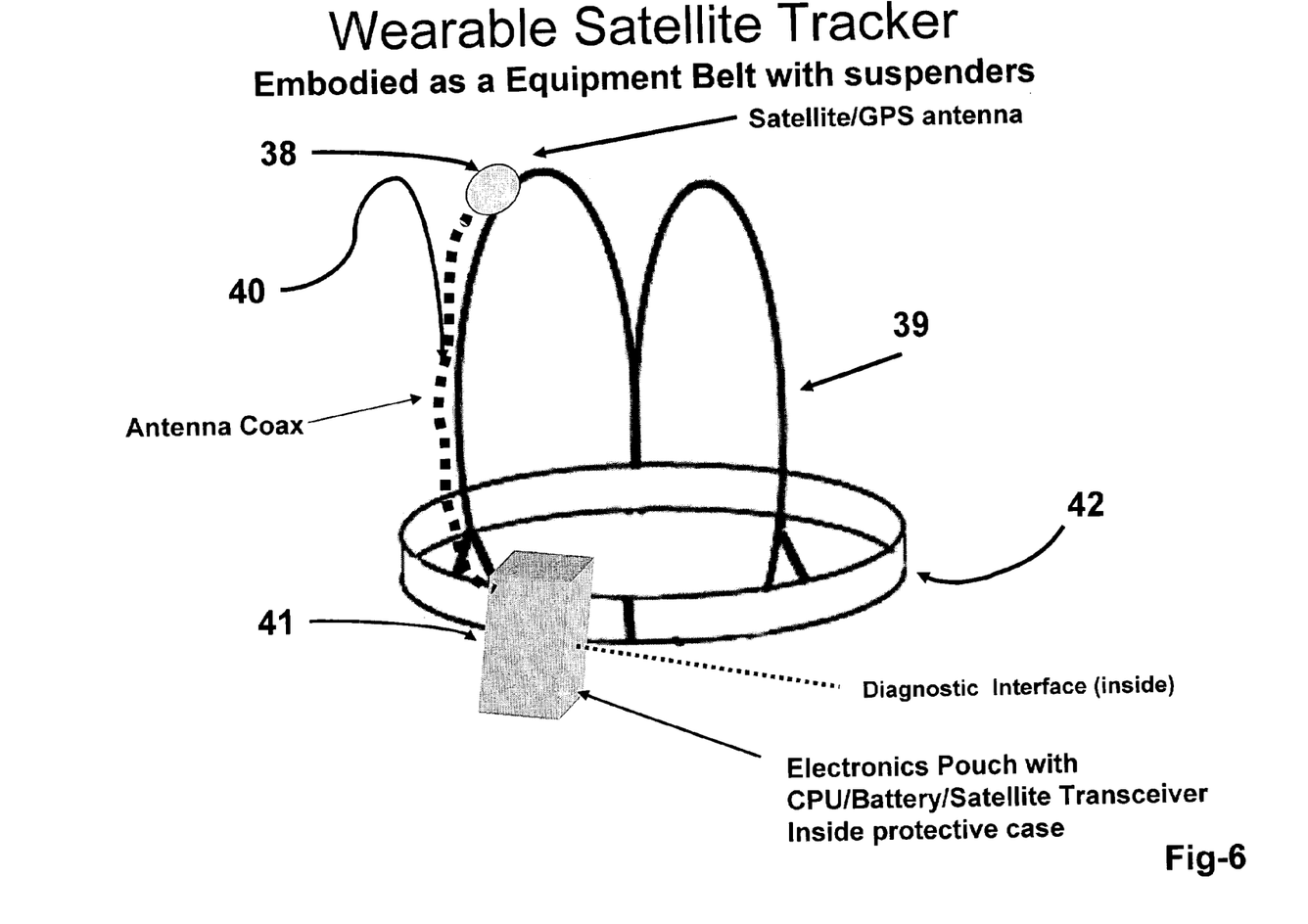
FIG. 6 is a front view of an embodiment of the Wearable Satellite Tracker for land use as a utility belt with suspenders.

FIG. 6 gives the embodiment of the WST for land use as a work belt with suspenders. An example of those who would use the embodiment are; forest fire fighters, hazardous material workers, or adventures. The Two-way satellite and GPS Receiver antennas (38) are mounted on the upper part of the suspenders (39) to give them the best view of the sky. The antennas are connected by coax cable (40) to the electronics package that is clipped on the belt. The electronic package 34 (41) contents are given in FIG. 7. Sensors can be inside the electronics package, for example shock sensor, or outside on the belt or suspenders, for example an immersion sensor 28, as necessary to get the best reading.

Figure 7:
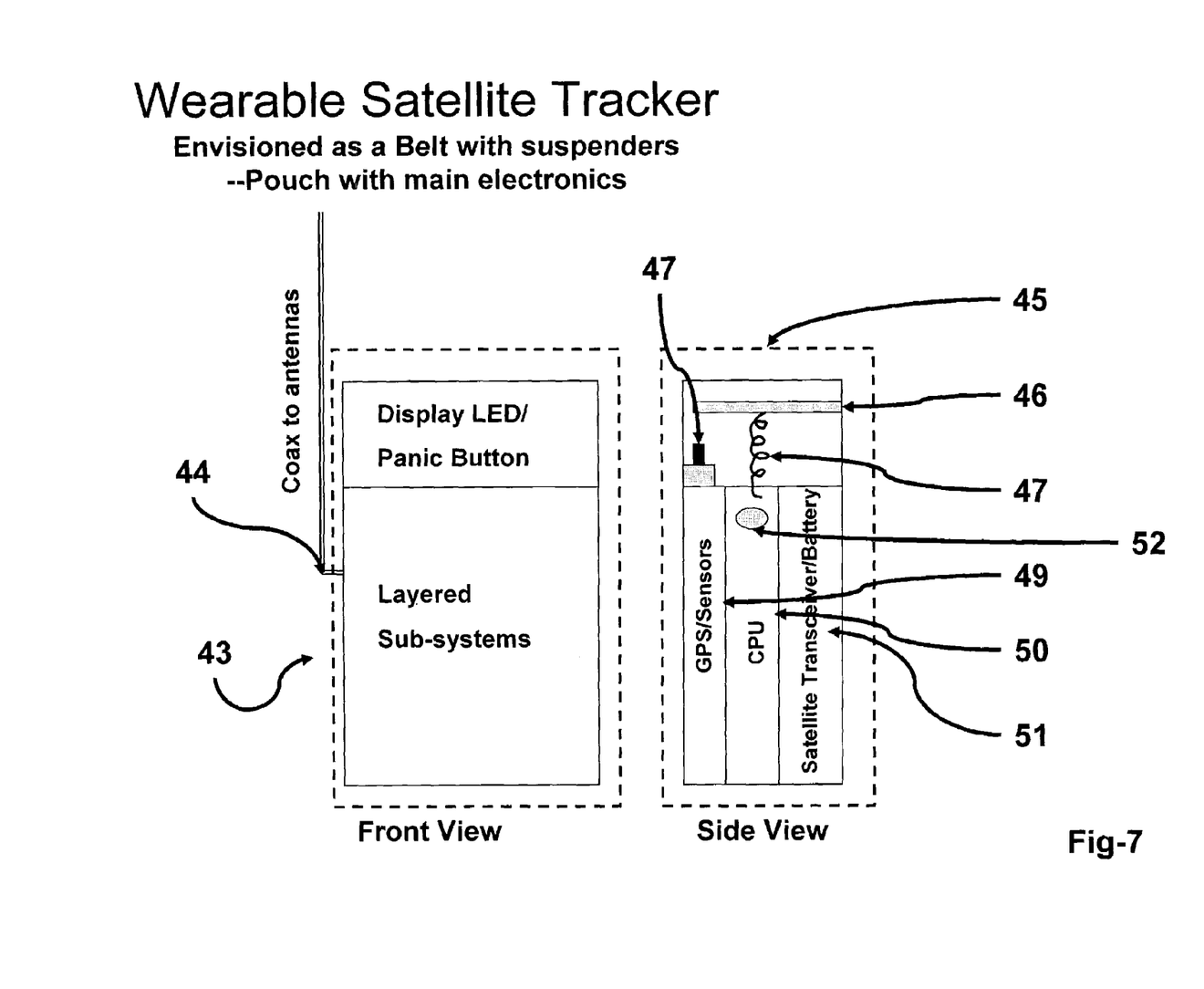
FIG. 7 is a cross sectional view of the electronics package of the Wearable Satellite Tracker mounted on the utility belt with suspenders in FIG. 6.

FIG. 7 details the electronics package of the WST mounted on the belt with suspenders in FIG. 6. The components are inside a waterproof case (43) and protected from shock by padding. The coax cables from both antennas enter the side (44) of the protective case. The components inside the case are laid out so the ones that need to be seen or touched by the operator are at the top so the are accessible by opening the top of the case or with a see-through top. The component at top are the Status Display (46) and the panic button 11. The components are mounted in the bottom of the case; the GPS and sensors (49), CPU (50) and Satellite Transceiver and battery 10. As the technology improves we see the entire WST unit being able to fit install a hard hat of an adventurer with special sensors based to the adventure, for example a g-force sensor to tell of a mountaineer falls.

Figure 8:
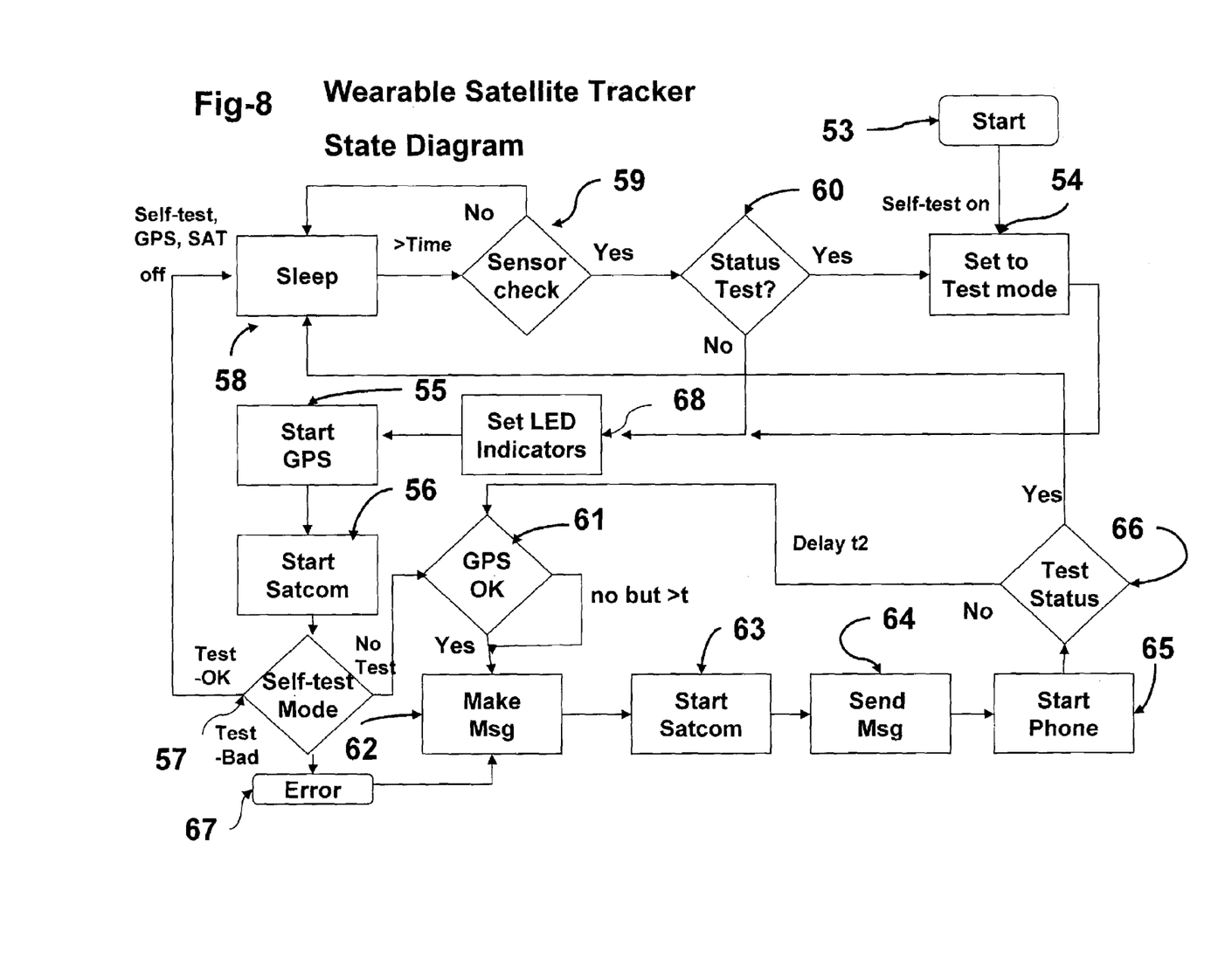
FIG. 8 is a State Diagram for the basic operation of the Wearable Satellite Tracker.

FIG. 8 gives a State Diagram for the basic operation of the WST. The Start State 53 is when the machine is first turned on or reset. The CPU performs a boot operation and begins with a self-test, in which the GPS receiver (55) and Satellite Transceiver or Satcom (56) are turned on to see if they connected but not checked for a quality reading nor is a message sent. If the Check for Self-Test (57) shows the components are connected they are turned off and the CPU goes to sleep status (58).

The CPU in the sleep state (58) uses the least amount of power, so to conserve battery 10 life. It then periodically wakes every few seconds and check the sensor status (59). If there is no sensor triggered, the CPU returns to the sleep-state (58). If a sensor is on, then the LEDs in the Status Display Indicator are set to red for the GPS, Satcom and System Status (68).

The GPS unit (55) and the Satellite modem (56) will be powered up. The LED status for the GPS and Satcom are set to yellow when these units respond to a check, indicating the have power applied to them and have Communications with the CPU.

After a sufficient time has passed it will check to see if the GPS location is good (61), that is accurate. The read out of the GPS unit will identify the quality of the output. The time, T, is set for the normal cold start time the GPS unit requires to achieve a good position; the state of the art today is 45 seconds for a cold start. If the lapsed time since stat-up is greater than T and the GPS receiver has not achieved a good position, the CPU will form a message noting the poor position and send it. The LED status for the GPS will remain at yellow. If the GPS receiver indicates it has a good position, that is the quality of the position is good, the LED status will be changed to green.

A message is the formed (62), and sent to the Central Tracking Monitor (64). It is sent as a test message if "Test–Status=True", otherwise it is considered as an alarm message. When an ACK from the Central Tracking Monitor has been received, the position message sending will be repeated, unless this process was started due to a test. After a successful alarm message is received by the Center Tracking Monitor, if there is an Optional Telephone Unit 15 with the WST (65), it will try and establish a telephone circuit to the Central Tracking Monitor. It will then repeat the sending of the tracking message (61) after a delay of t2 minutes.

The Error State (67) is shown attached to the Check Self-Test (57). In the Error sate (67) the unit will try to send this it status to the Central Monitor Center (64). It is also implied that any detected failures in any state will send the unit to the Error State (67), those lines are not added to simplify the drawing.

Figure 9:
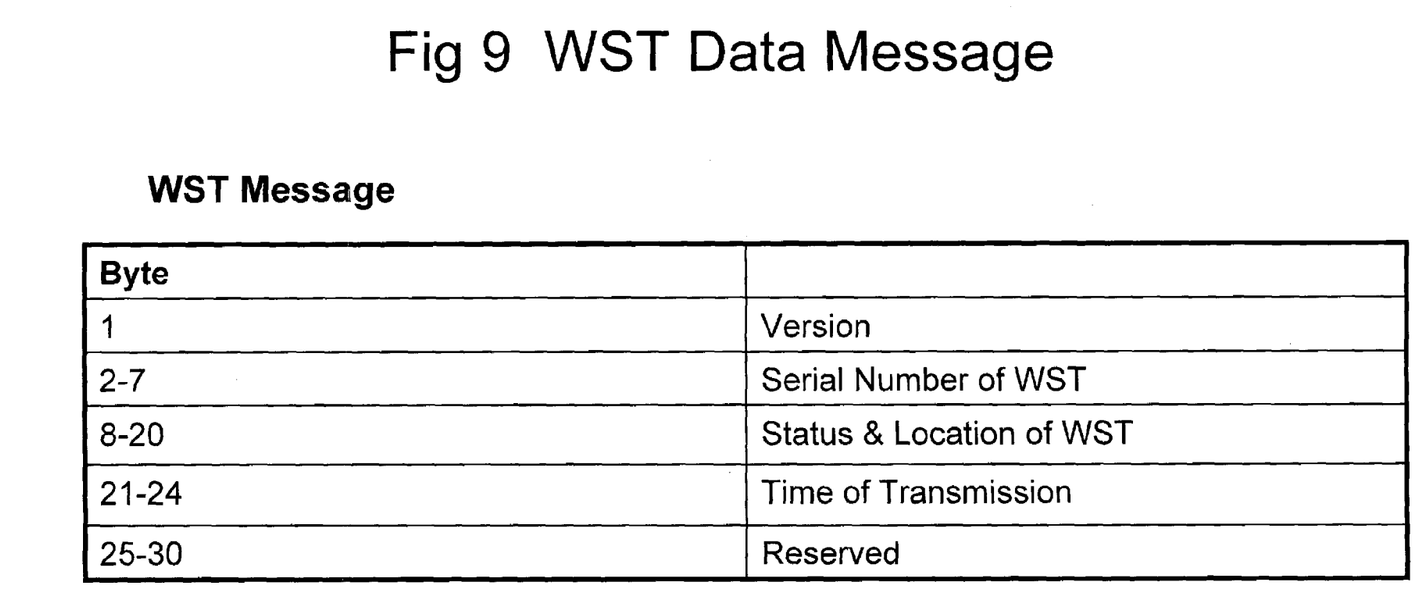
FIG. 9 is a the structure of the compact message from the Wearable Satellite Tracker to the Central Tracking Monitor where; Byte 1 is the version of message, Bytes 2–8 are the serial number of the Wearable Satellite Tracker, bytes 8–20 are the status and location of the Wearable Satellite Tracker, bytes 21–24 is the Time of Transmission, and bytes 26–30 are reserved.

FIG. 9 shows the structure of the message from the WST to the Central Tracking Monitor where; Byte 1 is the version of message, Bytes 2–8 are the serial number of the WST, bytes 8–20 are the status and location of the WST, bytes 21–24 is the Time of Transmission, and bytes 26–30 are reserved.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

I claim:

1. A wearable satellite tracker for centralized management of testing and alarm information comprising:

a central processor unit having sufficient computing ability and storage memory to detect alarms and test switches, provide communications to a satellite modem, send and receive messages, and monitor self performance;

a central tracker monitor, providing a 24 hour service monitor that logs in all communications with all wearable satellite trackers, which includes both test messages and alarm messages;

a portable means of generating electrical power;

a satellite navigation receiver, for providing accurate location information and time to said central processing unit;

a satellite modem for providing two-way messaging to the said central tracking monitor from anywhere in the world;

a status indicator, for providing the wearer of the satellite tracker an indicator on the status of the wearable satellite tracker components and the satellite modem's two-way communications ability with the central tracker monitor;

a means for the wearer to generate an alarm message to the said central tracker monitor;

a means for the wearer of the wearable satellite tracker user to generate a test message to be sent to said central tracking monitor;

a plurality of alarm sensors, for generating an alarm message without the wearer's intervention;

a connection for communications between the central processing unit and another central processing unit;

a satellite transceiver, for two-way communicates between the wearable satellite tracker and the central tracking monitor;

a means of protection of the electronic components from environmental damage;

a central database, for keeping the information that allows the correlation between the wearable satellite tracker unit's message and the customer contact information;

a manually operated switch, which can be activated by the wearer, to cause the said central processing unit to perform the continuous sending of periodic position reports to the said central tracking monitor;

an immersion sensor, for detection of immersion in the water with the wearable satellite tracker, which can automatically have the said central processing unit send an alarm message to the said central tracker monitoring.

2. The wearable satellite tracker of claim 1 wherein said wearable satellite tracker is attached to a personal floatation device causing it to operate as a man-over-board device.

3. The wearable satellite tracker of claim 1 wherein said wearable satellite tracker is worn within utility belt or garment causing it to operate as a personal land tracking device.

* * * * *